(12) United States Patent
Malone et al.

(10) Patent No.: US 8,019,757 B2
(45) Date of Patent: Sep. 13, 2011

(54) DISTRIBUTED GLOBALLY ACCESSIBLE INFORMATION NETWORK IMPLEMENTED TO MAINTAIN UNIVERSAL ACCESSIBILITY

(75) Inventors: Michael K. Malone, Tigard, OR (US); Jon David Loucks, Tualatin, OR (US); Robert K. Terhune, III, Portland, OR (US); Cameron W. Cotrill, Beaverton, OR (US)

(73) Assignee: Thinkstream, Inc., Baton Rouge, LA (US)

( * ) Notice: Subject to any disclaimer, the term of this patent is extended or adjusted under 35 U.S.C. 154(b) by 529 days.

(21) Appl. No.: 12/240,750

(22) Filed: Sep. 29, 2008

(65) Prior Publication Data

US 2009/0094205 A1    Apr. 9, 2009

Related U.S. Application Data

(63) Continuation-in-part of application No. 10/920,894, filed on Aug. 17, 2004, now Pat. No. 7,430,587, which is a continuation of application No. 09/760,148, filed on Jan. 12, 2001, now abandoned.

(60) Provisional application No. 60/176,329, filed on Jan. 14, 2000.

(51) Int. Cl.
*G06F 17/30* (2006.01)

(52) U.S. Cl. .................. 707/733; 707/805; 709/203

(58) Field of Classification Search ............ 707/733, 707/805; 709/203
See application file for complete search history.

(56) References Cited

U.S. PATENT DOCUMENTS

| | | | |
|---|---|---|---|
| 5,623,652 A | 4/1997 | Vora et al. | |
| 5,778,368 A | 7/1998 | Hogan et al. | |
| 5,826,261 A | 10/1998 | Spencer | |
| 5,845,278 A | 12/1998 | Kirsch et al. | |
| 5,848,410 A | 12/1998 | Walls et al. | |
| 5,913,040 A | 6/1999 | Rakavy et al. | |
| 5,920,854 A | 7/1999 | Kirsch et al. | |
| 5,920,856 A * | 7/1999 | Syeda-Mahmood | 1/1 |
| 5,924,090 A | 7/1999 | Krellenstein | |
| 5,974,409 A | 10/1999 | Sanu et al. | |
| 5,983,216 A | 11/1999 | Kirsch et al. | |
| 5,995,956 A | 11/1999 | Nguyen | |
| 6,006,217 A | 12/1999 | Lumsden | |

(Continued)

OTHER PUBLICATIONS

Dos Santos, Andre L.M. et al., "Safe Areas of Computation for Secure Computing with Insecure Application", 1999 IEEE, pp. 35-44.

(Continued)

*Primary Examiner* — Cheryl Lewis
(74) *Attorney, Agent, or Firm* — Stoel Rives LLP

(57) ABSTRACT

A distributed information network is constructed for gathering information from sites distributed across a globally accessible computer network, i.e., the Internet. The distributed information network preferably includes a root server that stores a list of multiple distributed sites each represented by metadata. A network browser delivers an information search request to the root server, which in response develops a profiled information search request. The information provider of each of the distributed sites stores metadata corresponding to information content that is retrievable in response to the profiled information search request for search results derivable from the information content to which the metadata correspond. A profiled information communication link between the root server and each of the multiple distribution sites enables formation of a path for delivery of the search results to a destination site, from a site or sites represented by the metadata of the profiled information search request.

21 Claims, 12 Drawing Sheets

U.S. PATENT DOCUMENTS

| | | | |
|---|---|---|---|
| 6,055,526 | A | 4/2000 | Ambroziak |
| 6,055,538 | A | 4/2000 | Kessenich et al. |
| 6,078,917 | A | 6/2000 | Paulsen et al. |
| 6,081,774 | A | 6/2000 | de Hita et al. |
| 6,088,675 | A | 7/2000 | MacKenty et al. |
| 6,094,649 | A | 7/2000 | Bowen et al. |
| 6,100,890 | A | 8/2000 | Bates et al. |
| 6,112,212 | A | 8/2000 | Heitler |
| 6,128,624 | A | 10/2000 | Papiernak et al. |
| 6,144,375 | A | 11/2000 | Jain et al. |
| 6,151,601 | A | 11/2000 | Papiernak et al. |
| 6,195,725 | B1 | 2/2001 | Luhmann |
| 6,263,332 | B1 | 7/2001 | Nasr et al. |
| 6,275,820 | B1 * | 8/2001 | Navin-Chandra et al. ............ 1/1 |
| 6,343,287 | B1 | 1/2002 | Kumar et al. |
| 6,349,307 | B1 | 2/2002 | Chen |
| 6,363,377 | B1 | 3/2002 | Kravets et al. |
| 6,370,527 | B1 | 4/2002 | Singhai |
| 6,374,252 | B1 | 4/2002 | Althoff et al. |
| 6,401,091 | B1 | 6/2002 | Butler et al. |
| 6,424,968 | B1 | 7/2002 | Broster et al. |
| 6,434,548 | B1 | 8/2002 | Emens et al. |
| 6,442,589 | B1 | 8/2002 | Takahashi et al. |
| 6,456,305 | B1 | 9/2002 | Qureshi et al. |
| 6,476,827 | B1 | 11/2002 | Porter |
| 6,484,162 | B1 | 11/2002 | Edlund et al. |
| 6,523,023 | B1 | 2/2003 | Sonnenberg |
| 6,591,261 | B1 | 7/2003 | Arthurs |
| 6,601,061 | B1 | 7/2003 | Holt et al. |
| 6,643,641 | B1 | 11/2003 | Snyder |
| 6,643,701 | B1 | 11/2003 | Aziz et al. |
| 6,665,656 | B1 | 12/2003 | Carter |
| 6,760,746 | B1 | 7/2004 | Schneider |
| 6,804,674 | B2 | 10/2004 | Hsiao et al. |
| 2005/0004898 | A1 | 1/2005 | Bluhm |

OTHER PUBLICATIONS

Hinds, Nigel et al., "Managing Metadata for Distributed Information Servers", Proc. 31st Annual Hawaii International Conference on System Sciences, 1998 IEEE, pp. 513-522.

"About Archie 3.0," <http://archie.emnet.co.uk/readme.html> (2 pages)—(printed Jan. 14, 2002).

"Gopher," <http:/www.w3.org/History/19921103-hypertext/hypertext/ Products/Overview.html> (2 pages) (printed Jan. 14, 2002).

"Surfing . . . Gopherspace," by Bob Brand <http://wvvw.thebee.com/bweb/iinfo15.htm> (4 pages) (printed Jan. 14, 2002).

"Overview—The WAIS Protocol," University of Dortmund, Germany <http://Is6-www.informatik.uni-dortmund.de/ir/projects/freeWAIS-sf/fwsf 1.html> (2 pages) (printed Jan. 14, 2002).

"WAIS FAQ," <http://www.ou.edu/research/electron/internet/wail-faq.htm> (5 pages) (printed Jan. 14, 2002).

"comp.infosystems.wais Frequesntly Asked Questions [FAQ] (with answers)," <http:// Www.unigiessen.de/faq/archiv/wais-faq.getting-started/msg00000.html>(7 pages)printed Jan. 14, 2002.

"Z39.50," <http://www.indexdata.dk/z3950> (2 pages) (printed Jan. 14, 2002).

"Z39.50 and the World Wide Web," <http://www.dlib.org/dlib/march96/briefings/03indexdata.html> (4 pages) (printed Jan. 14, 2002).

Bhimani, Anish "Securing the Commercial Internet", Communications of the ACM., vol. 39, Issue 6, pp. 29-35, ISSN:0001-0782, (Jun. 1996).

* cited by examiner

DISTRIBUTED GLOBALLY ACCESSIBLE INFORMATION NETWORK IMPLEMENTED TO MAINTAIN UNIVERSAL ACCESSIBILITY

RELATED APPLICATIONS

This application is a continuation-in-part of patent application Ser. No. 10/920,894, now U.S. Pat. No. 7,430,587 filed Aug. 17, 2004, which is a continuation of patent application Ser. No. 09/760,148, filed Jan. 12, 2001, abandoned, which claims benefit of Provisional Patent Application No. 60/176,329, filed Jan. 14, 2000.

COPYRIGHT NOTICE

© 2008 Thinkstream, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This disclosure relates to systems and techniques for gathering and searching for information available at sites of a globally accessible information network such as the Internet and, in particular, to a distributed search architecture that facilitates real-time access to information residing on any number of distributed servers throughout the network and synthesizes the information for seamless access to specific information sought by a user.

BACKGROUND INFORMATION

Although it has exhibited explosive growth and extensively impacted the worlds of information and commerce, the globally accessible computer network known as the Internet has effectively become an unstructured victim of itself. Internet information usage has largely lost its utility because traditional search engines can neither access the vast available information pool nor qualify it adequately. The best present search engine can keep track of and access only a small fraction of Internet World Wide Web pages (i.e., about one billion of 550 billion available documents). The accessible sites are categorized in rudimentary fashion using key words rather than intelligent assessment of content. A current common result of searches for information, even limited to the small fraction of the available information, is thousands, and often millions, of irrelevant responses.

Information collection and distribution on the Internet take place as follows. A conventional Internet search engine uses software (called "spiders") that roams the Web to gather information, which is distilled, indexed, and cataloged in a central database. An Internet search conducted by a Web user of that search engine produces results that come from the database, not from the Internet itself. The results produced are references to Internet addresses, thereby requiring the Web user to open multiple sites in search of the information.

Current search engines do not include an ability to mass-search all sites and retrieve and organize the search results by content; therefore, searches are applied to all accessible information, irrespective of whether it is relevant. The result is a largely ineffective search engine effort and non-responsive returns on search queries. Examples of such traditional search engines include Northern Light™, Snap™, Alta Vista™, HotBot™, Microsoft™, Infoseek™, Google™, Yahoo™, Excite™, Lycod™, and Euroseek™.

The conventional search technology is, therefore, based on a model in which the indexes, references, and actual data (in the case of commerce networks) are centralized. All queries take place at central sites, and the data distributed are not updated in real time (and are typically stale) and usually require reformatting. The Internet is at best a frustrating search environment because the data reside in multiple formats and in a distributed world.

For applications in commerce, the existing Internet architecture can accommodate only a small fraction of the business participation that would otherwise be available to produce consumer benefits arising from competition. The Internet as a consequence effectively serves only the large dominant players, while effectively excluding everyone else. Part of the e-commerce perception is that virtually anything can be purchased over the Internet. While the perception is accurate, it ignores the fact that bias in the current system locks out a much greater part of the marketplace than it serves. Business to business commercial utilization of the Internet consists largely of e-mail communications.

For applications in delivery of services, particularly as various governmental entities have attempted to use the Internet, the lack of sensible structure is especially notable. These situations do not exist through the fault or incompetence of users but again stem from an inherent and systemic limitation of the "centralized" Internet.

The efforts of traditional search sites to retain and attract more consumer attention and thereby generate more advertising revenue have caused the attempt to centralize all online information to rise to the point of conflict. As stated above, the growth in the volume and the diversity of Internet content now lead to searches generating thousands of pages of results that encompass only a fraction of the overall body of relevant information. The market needs access to additional organizational structures, but the current system makes these requirements impossible to meet. Traditional search sites are designed and predicted to lead to further centralization, which will exacerbate the information accessibility problem.

Conventional wisdom has been that speed can offset the growth of Internet information. The industry emphasis has been on hardware improvements rather than next generation software. Five years ago, a state of the art personal computer used a 166 MHZ microprocessor chip. Currently, 800 MHZ microprocessor chips are standard, and 1,000 MHZ microprocessor chips are expected to be available soon. Ironically, while currently available machines can search for information much more quickly, they also create information at a rate consistent with their speed. They are in effect helping the problem keep pace with the solution. Insofar as emphasis has been placed on software, it has been to improve applications within the current architecture or to offer and market e-commerce alternatives within the current architecture. As a consequence, all such efforts are impeded before they begin.

Because of the sheer size of the Internet and the spiders operate from a central location, the spiders can cover only a small fraction of the entire Internet. The resulting database of search results is inherently limited not only in size but also in freshness. The required tradeoffs are self-defeating. Making the database broader and deeper would require excessive "roaming" time so that the information would become stale. Keeping the information fresh would require searching a smaller fraction of the available Internet documents, thereby making the results less comprehensive.

Total information is now growing at an exponential rate. Most of the new information winds up in the inaccessible category. There is no assurance that updated information will "bump" outdated information from the accessible information pool. The average age of newly returned World Wide Web links is 186 days. The milieu is frequently one of old information, insufficient information, disorganized information and, in short, unmanageable information. There is a pressing need, therefore, to fold the existing Internet into a new world of efficient organization that will competently manage future generations of growth.

SUMMARY OF THE DISCLOSURE

A distributed information network is constructed for gathering information from sites distributed across a globally accessible computer network, i.e., the Internet. These distributed sites are equipped to host and maintain their own information, while other associated technology enables inclusion of individual sites in mass Internet searches.

A preferred embodiment of the distributed information network includes a root server that stores a list of multiple distributed sites each of which represented by metadata corresponding to directly or indirectly available information content. Metadata are extended properties of a data object, which could be, for example, a single file, an object in a database, an e-mail message, a piece of memory, or a description of information content on a site. Metadata may be so simple as to represent a file name or size or so complex as to represent file author or database schema information. A user's network browser delivers an information search request to the root server, which in response develops a profiled information search request. Each one of multiple distributed sites is implemented with an information provider that is remotely located from the root server. The information provider of each of the distributed sites stores metadata corresponding to information content that is retrievable in response to the profiled information search request for search results derivable from the information content to which the metadata correspond. A profiled information communication link between the root server and each of the multiple distribution sites enables formation of a path for delivery of the search results to a destination site, such as the network browser, from a site or sites represented by the metadata of the profiled information search request.

The above-described preferred embodiment of a distributed information network provides an Internet search engine that advantageously uses the inherent strengths of the Internet—a distributed architecture. When a search request is initiated, the search engine queries multiple sites simultaneously and looks for the information, in whatever data format it resides, finds the information, and then returns the actual document to the user. A multithreaded-enabled client web browser sends simultaneous queries to distributed servers, thereby removing the bottleneck of a centralized server or searching body. The client web browser also manages the download of information from the server and, therefore, enables it to handle a dramatically greater number of clients than that handled by traditional present-day models. This distributed search application addresses the fundamental deficiencies in current Internet coverage: poor access, stale data stores, irrelevant information, and unstructured repositories of underutilized information.

The search architecture includes the ability to conduct a decentralized search of live data (structured or unstructured), search on specific parameters (price, brand, availability, reviews, and other such parameters), and present search results in clean, organized form on one display screen. The search architecture in effect moves the query to the location of the information. A user can continuously apply filters to search results and focus in on the specific product or information for what the user is looking.

Advantages of the distributed search architecture include conformance to industry standards; vertical and horizontal scalability, without requirements for additional hardware or degradation of performance; use of available bandwidth of the Internet instead of the available bandwidth of any one central search engine, thereby eliminating possible bottlenecks inherent with any centralized solution; delivery of accurate, current information; requirement of lower infrastructure resources (servers, electronic storage, and bandwidth) as a consequence of queries being distributed throughout the network; no performance degradation in relation to the number of sites searched and no limitations imposed on the number of sites searched; no effect of down sites on search results; and client management of all data sorting, filtering, and comparisons, thereby eliminating redundant network traffic and data processing currently required by present day architectures.

The use of distributed sites represents a fundamental change from the present central mass storage method and opens the doors to the remaining large fraction of stored but inaccessible information with the current architecture. The result is a creation of vast areas of new opportunities within e-commerce and corporate information sharing through information portals. Such new opportunities include applications in music and movie distribution, software application distribution, instant messaging, collaboration, auctions, individual commerce, parallel searches, and e-mail. This changeover allows more sophisticated business to business (B2B) and consumer e-commerce interaction.

The disclosed distributed information network provides an opportunity to establish new standards and methods for gathering information from distributed sites across the Internet. The disclosed network is adapted to keep pace with current World Wide Web growth and has applicability to virtually every merchant, corporation, and consumer. The distributed sites are able to host and maintain their own information while the network allows the individual sites to be included in mass Internet searches. The network is implemented as a single distributed architecture, with its own intelligent search engine, to manage digital information and uses software for the Internet and its content management to achieve responsive results from Internet searches.

The distributed architecture can be analogously described, conceptually, as being similar to telephone area codes or postal service zip codes. The difference is that coding is content specific rather than geography specific. The distributed information network architecture can search existing sites, including the 84% currently inaccessible sites, intelligently categorize them according to content, and codify them as required with single or multiple codes for future intelligent retrieval. Future sites can be readily integrated as they come online to be immediately available, thus ending the present 186-day lag. If desired, commerce users can download e-commerce web site software that permits custom presentation of the full inventory of products offered. A customer shopping for a particular product can across multiple vendor sites immediately compare, for example, vendor prices, warranties, return policies, and shipping costs.

The distributed search network and technology has applicability to e-commerce and serves to eliminate bias, thereby resulting in "Main Street" and individual commerce being served as well as the electronic superstores that currently dominate product offering and services. Main Street and individual sellers have little chance to create visibility within the confines of the current marketplace because search results are marketed and there is no provision for actual "live" product comparisons. The disclosed network presents a substantial opportunity for search results leading to an actual product, rather than a web site, and thereby offers solutions that eliminate bias and lead to a level playing field where sellers can be assured their sites and products are included.

The disclosed network permits sellers and corporations to direct control over the timing and context of their own information and facilitate a trend of "de-centralization" as a natural evolutionary step for the Internet. The search engine also functions within an information portal that will allow efficient B2B cooperation. For instance, component vendors no longer require direct system links with OEMs to ensure timely and adequate supply. The network allows immediate selection of category, product line, and brand name. All vendors enrolled in the architecture are represented for comparison. The network makes possible substantial vertical markets to exist for its solutions where private networks of searchable and structured information can be used to create supply and procurement systems and information research networks.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
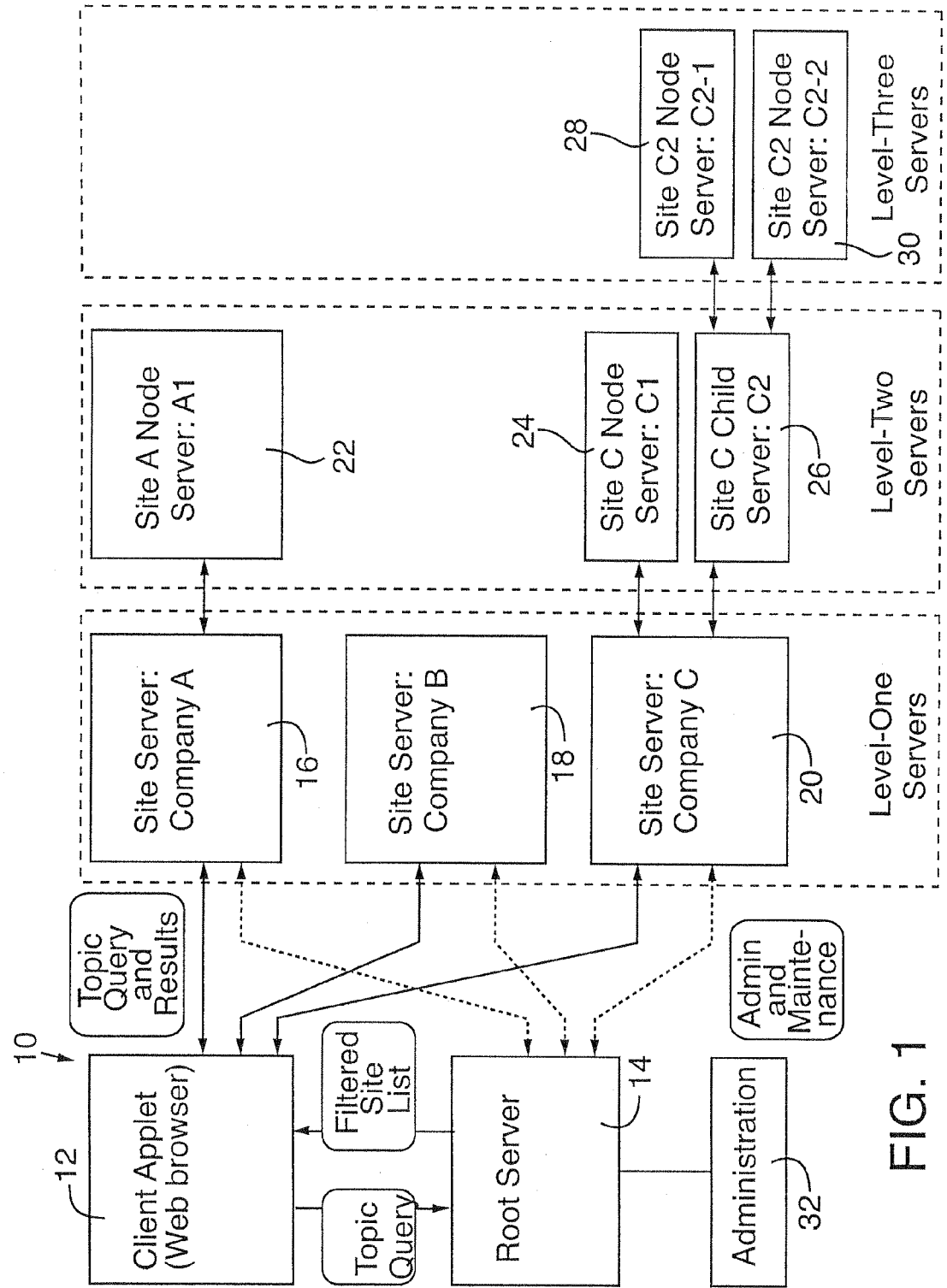
FIG. 1 is a block diagram of an example of a distributed application network configured in accordance with the disclosure.
Figure 2:
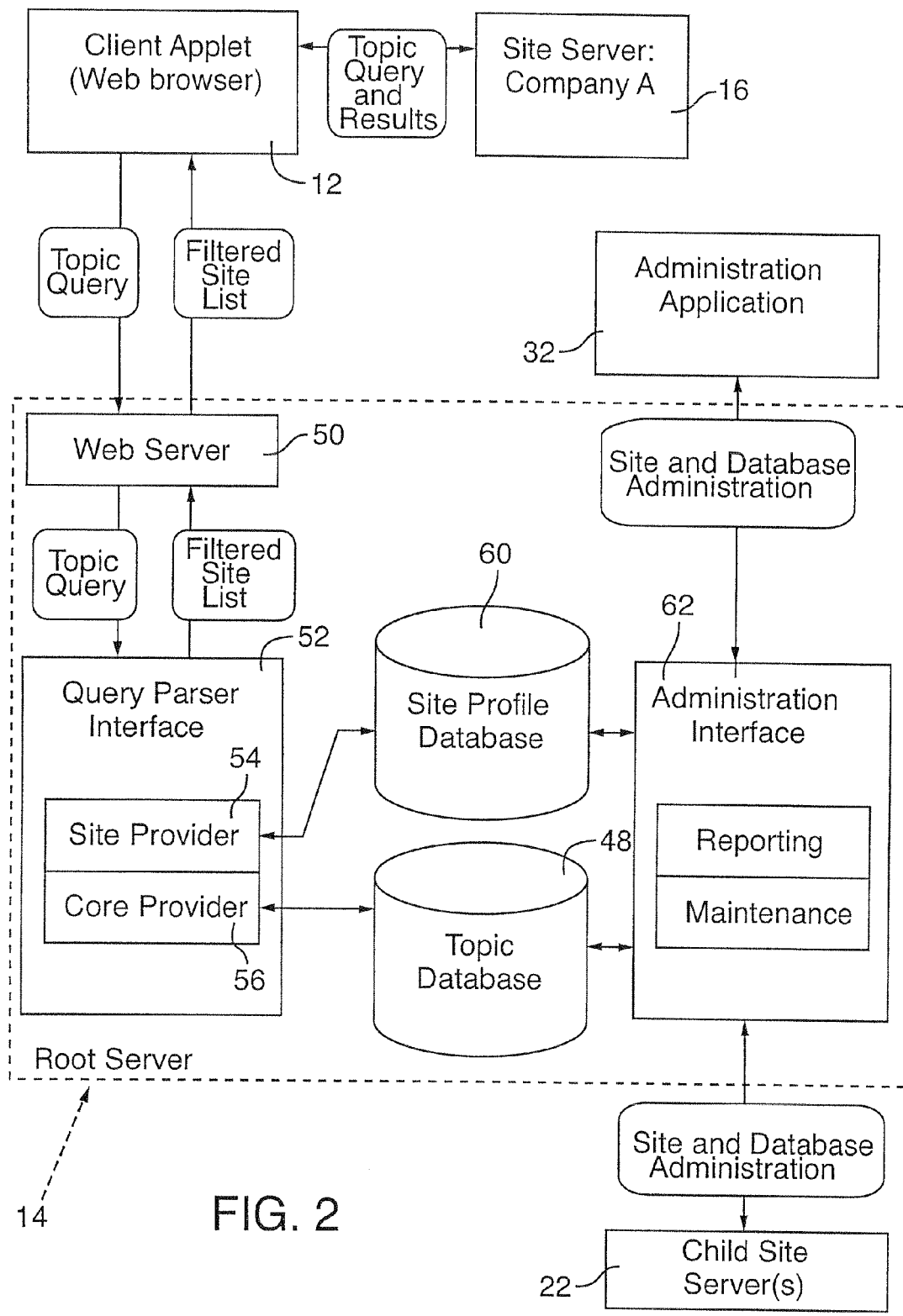
FIG. 2 is a block diagram showing in greater detail the internal structure of the root server shown in FIG. 1.
Figure 3:
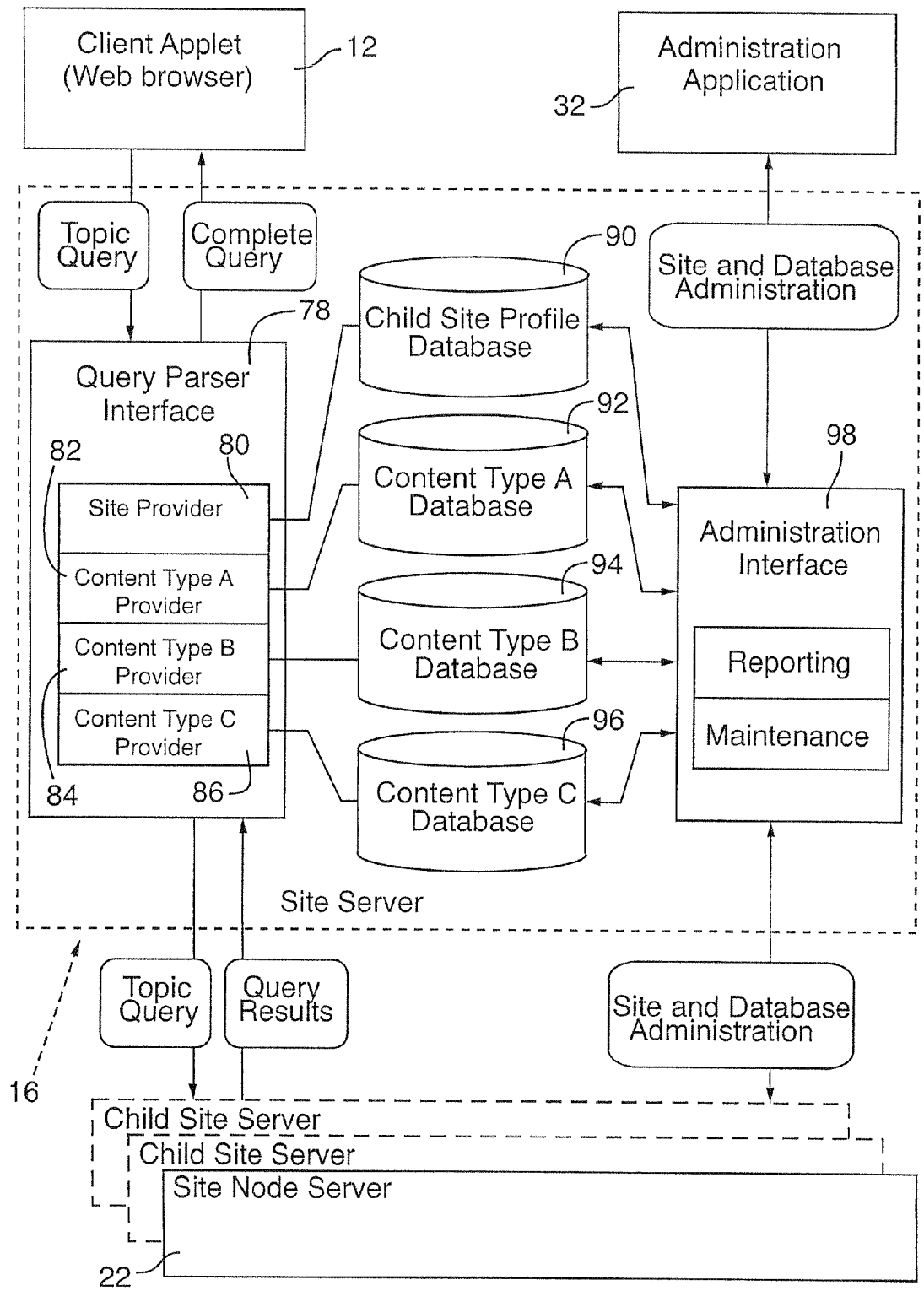
FIG. 3 is a block diagram of a level one site server, showing the program flow when a distributed query is performed in the distributed application network of FIG. 1.
Figure 4:
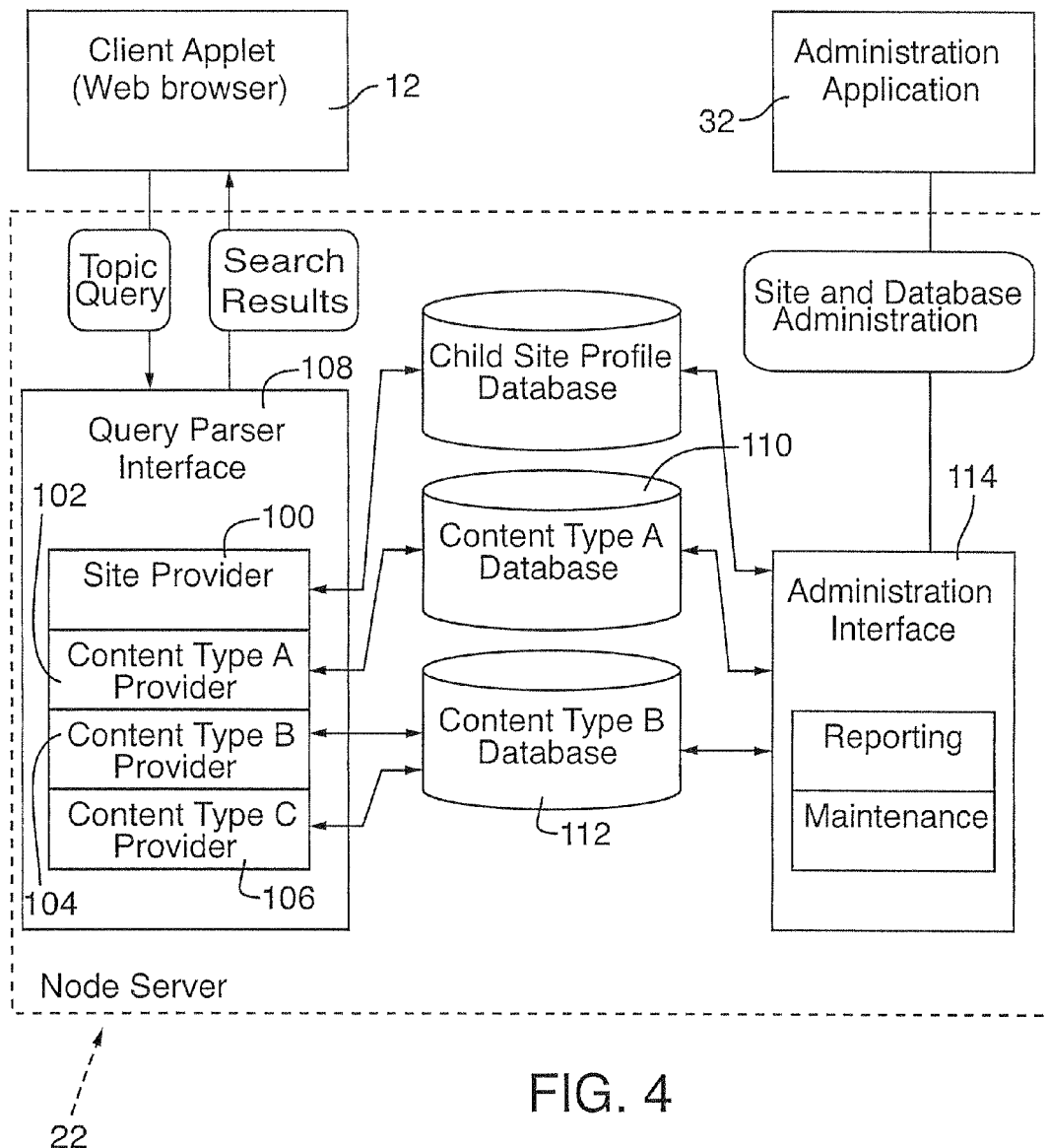
FIG. 4 is a block diagram of a level two site node server that has no sites registered with the site provider and has no child server.

FIG. 1 is a block diagram of an example of a distributed application network 10 configured in accordance with the disclosure and showing information flow paths in response to a particular end user request. An application network is a collection of servers that participate in a particular application of the disclosed distributed information network. Examples of an application network include an e-commerce network, an information portal, or a peer to peer (P2P) network. Network 10 is a hierarchical system of distributed servers that store network content and communicate with other servers in the network. The hierarchical system is one in which a server can have any number of child servers, each of which can have any number of its own child servers, with an unlimited number of successive levels of dependent servers possible. This structure helps distribute the storage of content and the processing load on the network. FIGS. 2-4 show in greater detail the internal structures of, respectively, root, site, and site node servers represented as system component blocks in FIG. 1. FIGS. 1-4 support the following explanatory overview of the core technology implemented in a distributed Internet architecture operating in response to a typical search for content by a user.

With reference to FIG. 1, network 10 includes an operating system client, which is typically a web browser or client applet 12 that is stored in an end user's computer. The client applet is client-side software that is preferably written in JAVA language code (but could be written in any other software development language) and allows any computer to participate in the network. Client applet 12 is the software interface between the user and the application network. A root server 14 located remotely from the user's computer is implemented with a root profiler that stores a list of multiple sites distributed across a global computer network, such as the Internet. Root server 14 is the single "ancestor" of all servers and child servers and is the main point of entry for client applet 12. Root server 14 has three children, site servers 16, 18, and 20 representing level one servers of Company A, Company B, and Company C, respectively. Site servers 16, 18, and 20 represent examples of information sources listed in the root profiler of root server 14 and qualified in response to a user's specific request. Skilled persons will appreciate that there are many different candidate information sources, such as, for example, state and other government networks, corporate data, commercial and educational information web sites, e-commerce web sites and individual desktop personal computers (PCS).

Each of site servers 16, 18, and 20 is implemented with an information provider that stores retrievable metadata, which is kept current by and under control of the company with which the site server is associated. Metadata are information about the locally resident content stored on each site server and the content on any child servers a site server might have. There are two basic types of metadata, which are topic data and site-profile data. A topic is a unit of content served up by an application network. The topic database at a site server stores information about the type of information stored at the site and its child sites. (In FIGS. 2 and 3, the topic databases are labeled, respectively, "Topic Database" at root server 14 and "Content Type" databases at site server 16.) The site-profile database stores information about which ones of the servers, including itself and its children, store what types of topics. Site servers 16, 18, and 20 provide, therefore, a set of metadatabases, which are databases of information about the information that is stored and exchanged on network 10 and which are databases that keep track of where particular types of information are stored on network 10. The root profiler identifies site servers 16, 18, and 20 by content-specific codes that represent topic profiles indicative of the information content site servers 16, 18, and 20 contain. Site server 16 of Company A is associated with a level two server, Site A node server 22. Site server 20 of Company C is associated with two level-two servers, Site C node server 24 and Site C child server 26. Site C child server 26 is associated with two level-three servers, Site C2 node server 28 and Site C2 node server 30.

FIG. 1 illustrates the operation of network 10 when a user causes web browser 12 to request from root server 14 the identification of qualified servers relating to a specific topic. Client applet 12 sends the request to site servers 16, 18, and 20, all of which root server 14 identified as qualified in response to the topic the user requested. (The arrow-tipped broken lines drawn between root server 14 and each of site servers 16, 18, and 20 represent communication pathways for updating metadata about sites on the network and relationship activity (e.g., transaction tracking and reporting) that links them and do not indicate search pathways.)

Network 10 processes a user topic query request as follows. A network user browses a web page on root server 14. If it is not already installed on the user's personal computer, the client applet is downloaded and installed (with the user's permission). Client applet 12 downloads a current topic database 48 from root server 14, displaying the topic structure typically as a hierarchical tree of categories. Client applet 12 then allows the user to navigate the category tree until the user finds the category of topics of interest. As soon as the user navigates to a category level that is of sufficient specificity to be associated with particular site servers, client applet 12 sends either an automatic or user-commanded query to root server 14. When client applet 12 indicates a search, the query request is sent to root server 14 for a list of site servers that qualify. Root server 14 returns to client applet 12 a packet of information containing a list of all qualified site servers on application network 10 that have the type of content requested. Site servers 16, 18, and 20 represent the site servers appearing on the list in the example illustrated in FIG. 1. As the user navigates down the tree toward the topic level, client applet 12 uses the available metadata to display an attribute selector. This lets the user select specified attributes, features, characteristics, specifications, and other aspects of the topic that enable the user to narrow the focus of the search. When the topic query is sufficiently specific, the user executes it. The user's client applet 12 in this example compiles a list of site servers 16, 18, and 20, performs a topic query on each of them, and awaits the results site servers 16, 18, and 20 produce. Processing of the topic query request entails directing it to all three of the level one site servers 16, 18, and 20. Site servers 16 and 20 then pass the topic query request to the three level-two servers 22, 24, and 26. Site C child server 26 further passes the topic query request to Site C2 node servers 28 and 30. This process takes place while bypassing any servers that do not have the pertinent content. The results obtained are directed back, again while bypassing all other servers, to client applet 12 for display to the user. The user can then review the search results and click through to any of the linked content sources. Administration application software 32 (FIGS. 2 and 3) communicates with root server 14 to keep track of the number and types of topic search requests processed, as well as update the metadatabases on the site servers.

FIG. 2 is a block diagram showing in greater detail the internal structure of root server 14. FIG. 2 shows the program flow when a site server list is compiled in root server 14 and delivered to client applet 12 in response to a topic query request made by a user. With reference to FIG. 2, the topic query request initiated by client applet 12 passes through the World Wide Web to a web server 50 on which web pages associated with root server 14 are stored. (Web server 50 may be physically separate from or a part of root server 14.) Web server 50 passes the topic query request to root server 14, which uses its information providers to query its database for all servers that match the request type. Root server 14 is implemented with a query parser interface 52 that includes a site provider 54 and a core provider 56 to interpret the topic query request. Each of site provider 54 and core provider 56 is preferably a JAVA language-based program that runs on root server 14. The site provider 54 and core provider 56 components of query parser interface 52 consult the local metadatabases to determine which site servers lead to the specific type of topics content requested. This entails identifying site servers that themselves have the right topics or are associated with descendant servers that have the right topics. Site provider 54 identifies site servers corresponding to the content-specific codes representing the topic profiles, and core provider 56 identifies properties of the topics. Query parser interface 52 accesses and retrieves information from topic database 48 and a site profile database 60 to assemble the packet of information containing the list of qualified site servers to search. The packet of information represents a profiled information search request generated by root server 14. An administrative interface module 62 contains software for maintaining the databases and reporting on the frequency of access to them.

An example of a topic query request would be the identification of sellers of VCRs of a particular type. Site provider 54 retrieves from site profile database 60 the identities of site servers of companies that sell VCRs. Core provider 56 retrieves from topic database 48 the properties (e.g., cost of purchase, compact disk compatibility, and stereophonic sound capability) of the specified type of VCR. Root server 14 returns the assembled packet of information to the user by way of web server 50. The topic query request is then distributed through client applet 12 to the level one servers of the sites identified.

FIG. 3 is a block diagram of level one site server 16, showing the program flow when a topic query requested is performed. (Although site server 16 has only node server 22, FIG. 3 shows in phantom lines two child site servers of greater hierarchical level to demonstrate network scalability.) With reference to FIG. 3, site server 16 receives from client applet 12 a topic query request made by a user and profiled by root server 14. Site server 16 is implemented with a query parser interface 78 and processes the topic query request by determining whether site server 16 itself or an associated child node site server can support the topic query. Query parser interface 78 includes a site provider 82, a content Type A provider 82, a content Type B provider 84, and a content Type C provider 86, all of which represent different ways of collecting content information by bridging a topic query request and a database. For example, content Types A, B, and C may represent, respectively, e-commerce information, data, and site content (HTML).

Site provider 80, e-com provider 82, data provider 84, and HTML provider 86 access and retrieve content information from, respectively, a child site profile database 90, a content Type A (an e-com) database 92, a content Type B (data) database 94, and a content Type C (site content (HTML)) database 96. Each child node site server returns its search results to server 16, as is described below with reference to FIG. 4. The information providers of query parser interface 78 and the search results received from any child node sites are the sources from which site server 16 builds a site list that returns the complete search results to client applet 12.

When the content at any server changes, a site administrator uses administration application software 32 (FIGS. 2 and 3) to update the metadatabases on the site server. Those updates are automatically sent to all associated parent servers of greater hierarchical levels. An administration interface of each server (administrative interface 98 of server 16) at each level (and administrative interface 62 of root server 14) updates the local metadatabases. Each server along a lineage always has a current picture of the content available locally and through its child sites. Root server 14 hosts, therefore, complete and current metadatabases of what kind of information is stored on network 10 (in topic database 48) and the first step on the path to where the information is stored on network 10 (in site profile database 60).

FIG. 4 is a block diagram of a level two Site A node server 22, which has no site registered with its site provider 100 and has no child server. With reference to FIG. 4, a content Type A (e-com) provider 102, content Type B (data) provider 104, and content Type C (HTML) provider 106 residing in query parser interface 108 of Site A node server 22 provide qualified topics to be searched in a content Type A (an e-com) database 110 and a content Type B (site) content database 112. The results obtained from searches of databases 100 and 102 are returned to parent site server 16 for delivery to client applet 12. An administrative interface 114 updates the local metadatabases.

Site server 16, together with Site A node server 22; site server 20, together with Site C node server 24; and site server 20, together with Site C child server 26 and site C2 node 30, each form a local information network in accordance with the disclosure.

Site server 16 can be implemented with a local root profiler, which as indicated in FIG. 1, includes Site A node server 22 in its list of distributed local sites. Site A node server 22 is also expandable to accommodate its own local root profiler but in the example depicted in FIGS. 1 and 4 provides only local metadata in response to a local profiled information search request accompanied by an information content-specific local code corresponding to the information content of the local metadata.

Site server 20 can be implemented with a local root profiler, which as indicated in FIG. 1, includes Site C node server 24 and Site C child server 26 in its list of distributed local sites. Similarly, Site C child server 26 can be implemented with its own local root provider, which as indicated in FIG. 1, includes Site C2 node servers 28 and 30 in its list of distributed local sites. Each of Site C2 nodes 28 and 30 is also expandable to accommodate its own local root profiler.

The sites included in the level one servers and servers in successive levels function, therefore, either to list distributed sites or to provide metadata for processing by the distributed network.

Figure 5:
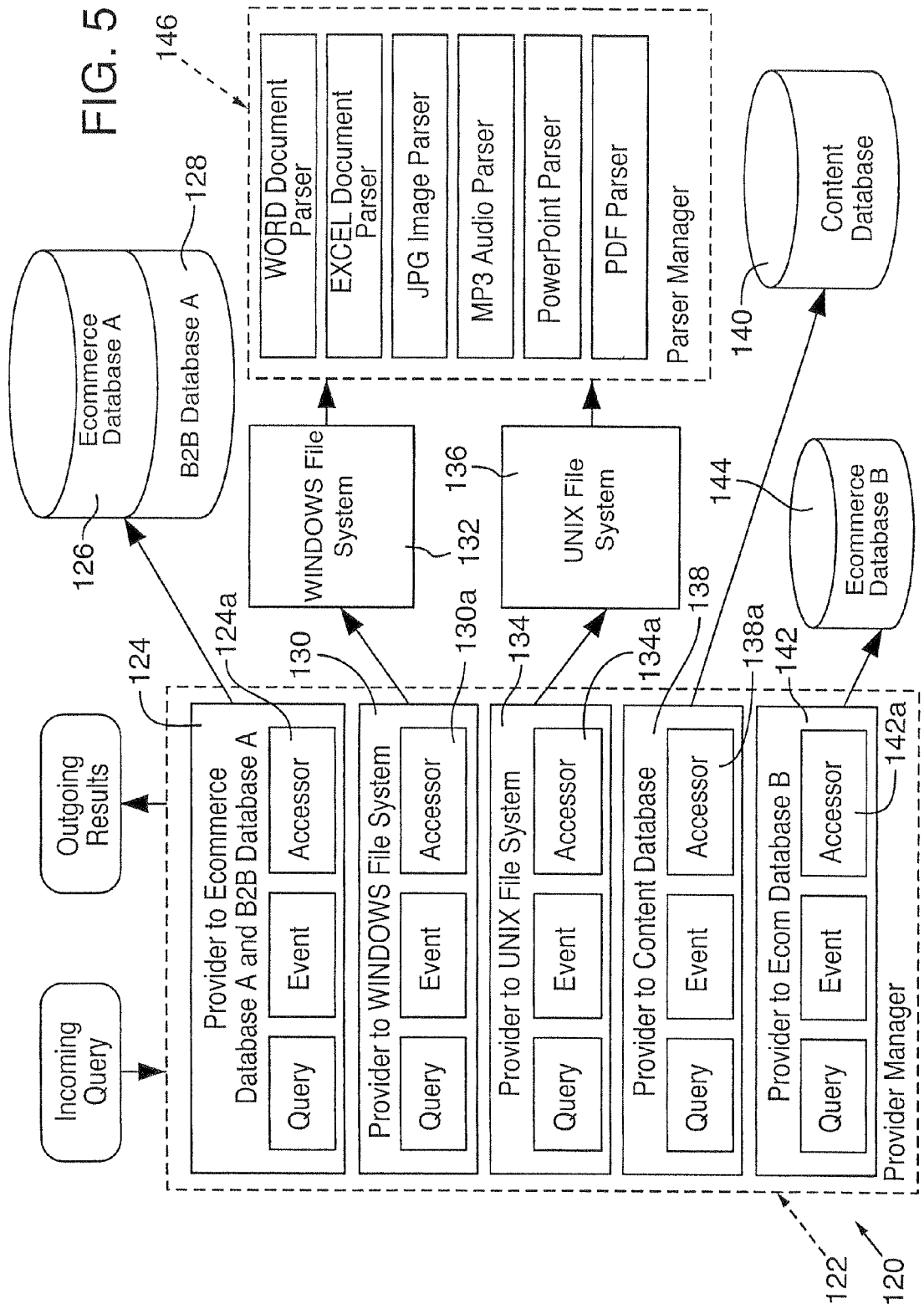
FIG. 5 is a block diagram of a site server on which coexist several different providers for a wide variety of information sources.

FIG. 5 shows a site server 120 on which coexist multiple different providers for a variety of information sources. The structural organization of site server 120 facilitates the capability of a distributed information network to access and extract useful information from a particular information source once it has been discovered. With reference to FIG. 5, site server 120 has a provider manager 122 that routes an incoming search query to an appropriate one or appropriate ones of the five providers shown in the example presented. The providers include a provider 124 to an e-commerce database A 126 and a B2B database A 128, a provider 130 to a WINDOWS file system 132, a provider 134 to a UNIX file system 136, a provider 138 to a content database 140, and a provider 142 to an e-commerce database B 144. Each of providers 124, 130, 134, 138, and 142 has a respective accessor 124a, 130a, 134a, 138a, and 142a. An accessor is capable of finding, opening, writing, and reading an object irrespective of the type of platform or data store. (A data store is a storage mechanism, such as a file system, database, e-mail system, or zip file, that may contain data in an organized format.) An accessor also has the ability to "spider" (i.e., examine the contents of) a data store or search for a single data object. (A data object is a single file, an object in a database, an e-mail message, a search result, or a piece of memory.) The appropriate providers for responding for a particular search query use their accessors to query their associated information sources or data stores. The accessors translate between the query language of a root server of the distributed information network and the query language of a data store. This implementation facilitates access to any information source and is described in detail below with reference to FIGS. 6 and 7.

File system accessors 130a and 134a use a parser manager 146, which functions as a computer language interpreter and in the example presented includes six parsers equipped to recognize documents in six different software file formats. A parser knows how to read the contents of a data object and thereafter extract metadata and store them in a common format. The six parsers include WORD document, EXCEL document, JPG Image, MP3 audio, POWERPOINT, and PDF parsers. Irrespective of where and how a particular file is stored, parser manager 146 directs the file to the appropriate parser. For example, if a file represents a WORD document, the WORD document parser extracts the metadata for the provider. The providers, together with parser manager 146, enable access to any type of information including: static web pages, word processor or spreadsheet documents, images, music, video, and legacy database information. The providers are expandable to automatically handle new data types.

The providers of the distributed information network allow retention by the information source itself of ownership of all data. The providers act as a window directly into the data source, thereby enabling information sources to control who has access to particular information and to control how results are displayed.

Figure 6:
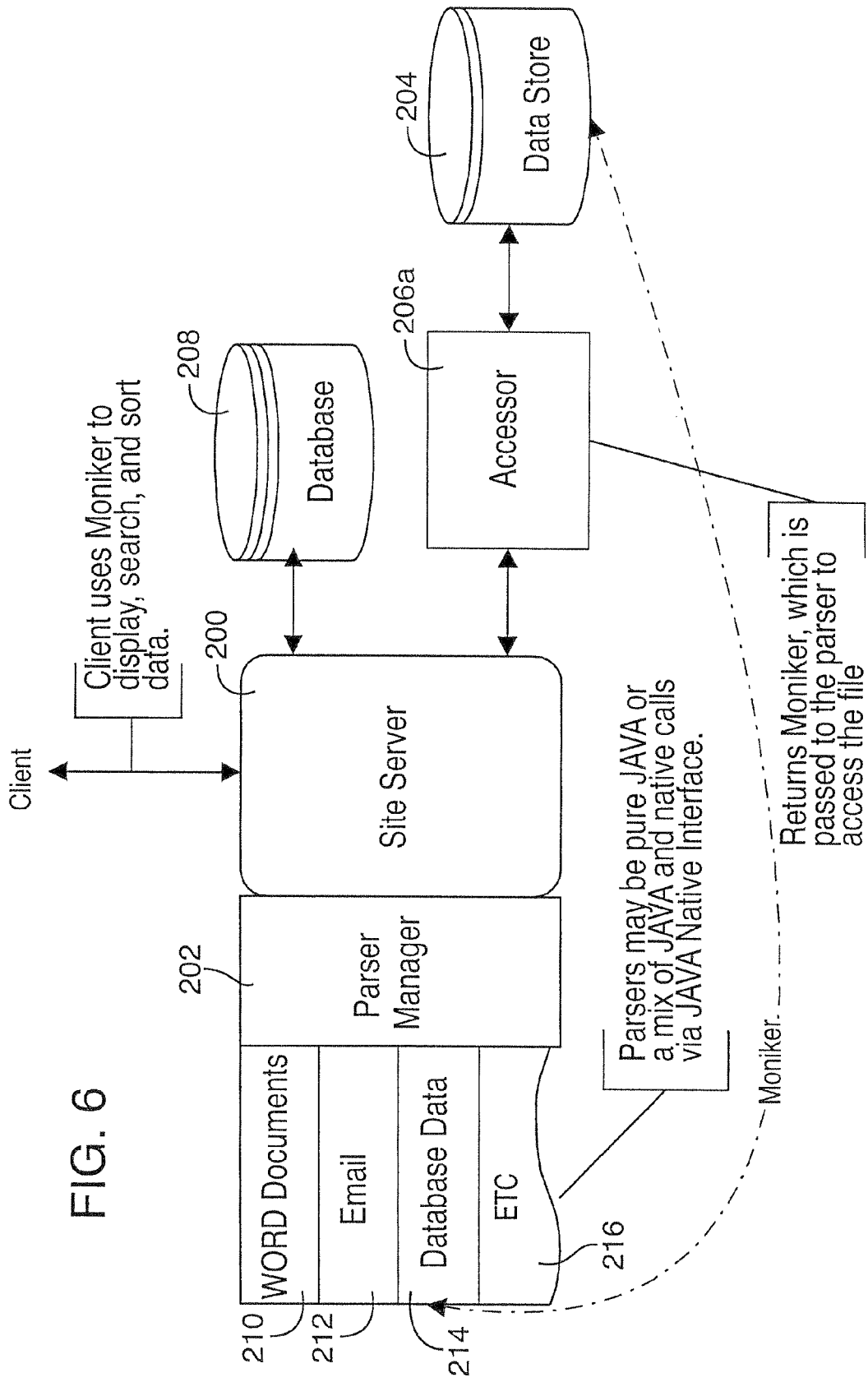
FIG. 6 is a block diagram showing a site servers parser manager and its parsers for a file accessor and its data stores for use in supporting an explanation of a method of accessing and parsing data in accordance with the disclosure.
Figure 7:
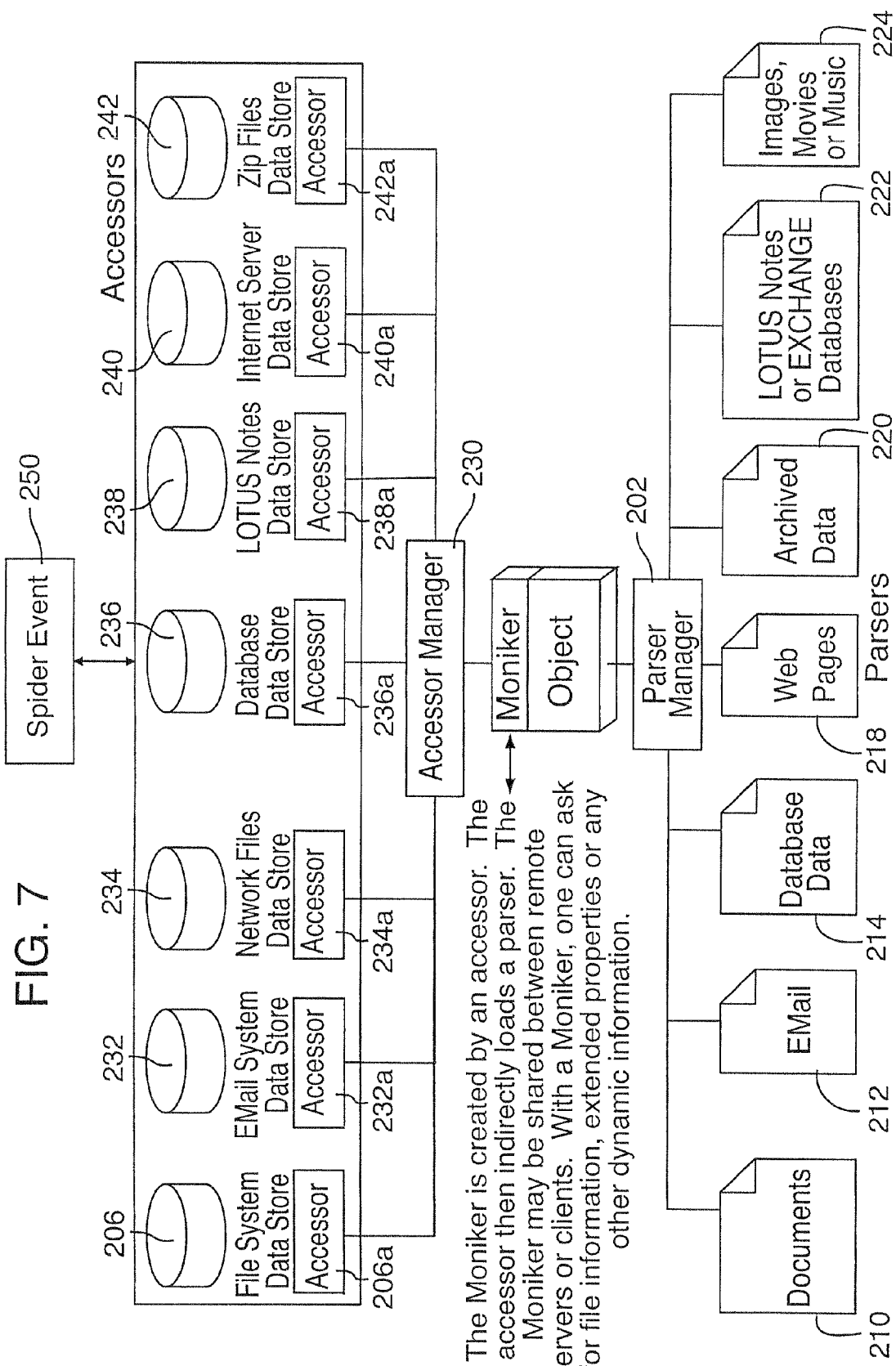
FIG. 7 is a block diagram showing in greater detail the structure and organization of certain component blocks of FIG. 6.

The role of an accessor stems from the existence of data in many forms and at many locations in many platforms. As stated above, the disclosed distributed information network implements a technique that accesses and parses the data in a consistent and secure manner and thereafter stores the metadata in a common format. FIGS. 6 and 7 support the following explanation of this technique. FIG. 6 is a block diagram of an exemplary site servers parser manager and its parsers for a file accessor and its data store. FIG. 7 is a block diagram showing in greater detail the structure and organization of a provider manager with seven accessors and a parser manager with seven parsers.

With reference to FIG. 6, a site server 200 functions to deliver to a parser manager 202 information from a data store 204 through an accessor 206a. (Accessor 206a is one of multiple accessors shown in FIG. 7.) A provider (not shown) in site server 200 is also connected to database 208 in a structural arrangement analogous to that shown for site server 120 and databases 126, 128, 140, and 144 in FIG. 5. Parser manager 202 directs information to multiple parsers, including, for example, a WORD documents parser 210; an e-mail parser 212; a database data parser 214; and other information parsers 216 representing collectively from FIG. 7 a web page parser 218, an archived data parser 220, LOTUS Notes or EXCHANGE databases parser 222, and an images, movies, or music parser 224. With reference to FIG. 7, an accessor manager 230 maintains a list of registered accessors, of which there are seven shown by way of example. Accessors 206a, 232a, 234a, 236a, 238a, 240a, and 242a are associated with, respectively, a file system data store 206, an e-mail system data store 232, network files data store 234, databases data store 236, LOTUS Notes data store 238, an Internet server data store 230, and zip files data store 232.

With reference to FIGS. 6 and 7, the technique for accessing and parsing data is a mechanism for walking (i.e., reading a file system) a data store and parsing it, irrespective of the location of the data or their type. By handling data stores and data objects generically, the system passes around a generic object that represents a data object. This data object is capable of accessing itself from the data store by loading and saving the information and to parse its data for extended properties. Process block 250 represents a spider event that initiates the process of accessing a data store and parsing it. A spider event begins with a starting location and a starting accessor. There is one accessor associated with each data store. An accessor has the ability to spider a data store or search for a single data object.

An accessor walks a list of objects on its data store and either creates an alias (called a "Moniker") out of the object or loads another accessor to process the object. A Moniker is an object that wraps a data object, which may be a file, a piece of data in memory, or an abstract link to any type of object. The Moniker is what is passed among accessors, parsers, servers, and clients. Accessors have a find first/find next interface that returns Monikers or references to other accessors. Accessors also have a user interface with the ability to include or exclude data and set starting and ending locations when processing a data source.

Accessor manager 230 maintains a list of all registered accessors and loads them as necessary. The Moniker is created by the accessor. The accessor then indirectly loads a parser. The Moniker may be shared among remote servers or clients. With a Moniker, one can ask for file information, extended properties, or any other dynamic information.

Parser manager 202 can load a parser for a given file type. A parser processes a file by extracting data. A parser may support many data types or a single specific data type. There may be multiple parsers supporting the same data type, and parser manager 202 determines the best parser based on the platform, installed components, or other factors. Any parser can use any accessor.

The use of an accessor, parser, and Moniker provides an ability to walk any data store or data stores imbedded in other data stores (e.g., zip files on file systems or e-mail) and open and parse data irrespective of the file format.

Figure 8:
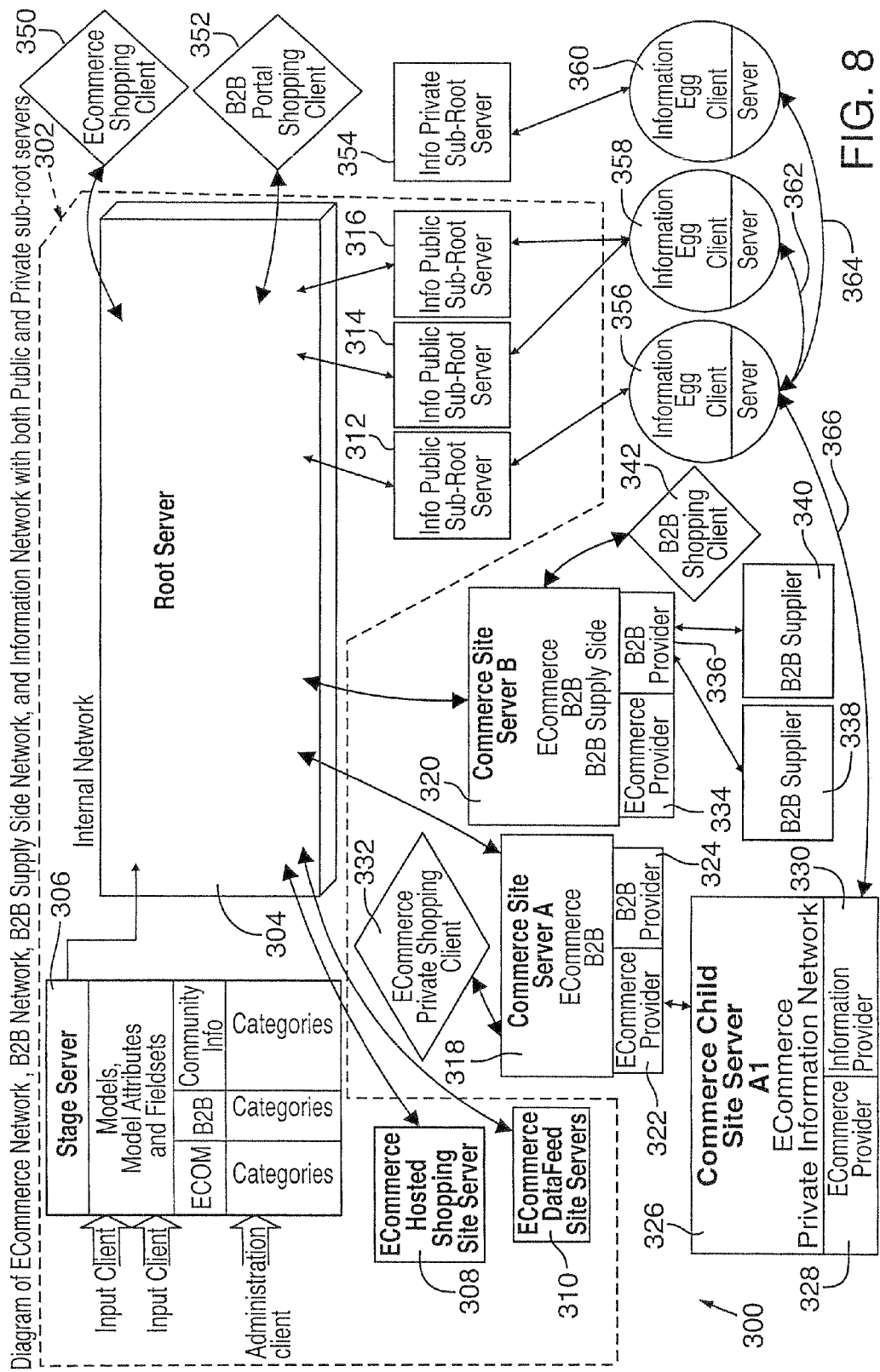
FIG. 8 is a block diagram of a distributed information network composed of an e-commerce network, a business to business network, a business to business supply side network, and an information network implemented with public and private servers.

FIG. 8 is a block diagram showing a distributed information network 300 composed of several application networks, demonstrating a distributed Internet architecture representing a hybrid of centralized and peer to peer models. With reference to FIG. 8, distributed information network 300 includes an internal network 302 composed of a root server 304, a stage server 306, an e-commerce hosted shopping site server 308, e-commerce datafeed site servers 310, and information public sub-root servers 312, 314, and 316. Root server 304 operates in the manner described above for root server 14 of FIG. 1, and stage server 306 enhances metadata collected from various servers in network 300.

In particular, stage server 306 uses models, model attributes, and field sets to perform various information manipulations, comparisons, arrangements, and other processes for presentation to the client user the retrieved information in a way that bridges the information gap inherent in current prior art search engines. As indicated in FIG. 8, to administer its operation, stage server 306 is organized by clients, such as e-commerce, business to business (B2B), and community information. B2B e-commerce refers to trade that is conducted between a business and its supply chain or between a business and other business end-customers. E-commerce hosted shopping site server 310 is an online marketplace that introduces consumers directly to products. Site server 310 provides through root server 304 real-time, direct access to each subscribing merchant's catalog that leads to an actual product listing, rather than a link to a web site. The information provider technology described above enables advanced custom tailoring of information such as dynamic pricing and category filtering. E-commerce datafeed site servers 310 store in internal network 302 client-provided information as an accommodation to information providers that do not want live searches conducted at their sites.

Information public sub-root servers 312, 314, and 316 represent three examples of sub-root servers for public community interest groups, each of which potentially having a growing number of information providers and information consumers. These sub-root servers, which are hosted and administered by a network manager and operate in cooperation with root server 304, give real-time, direct access to every information source in its network to ensure all current information is accessible with no dead links returned.

E-commerce hosted shopping site 308 and information community sub-root servers 312, 314, 316, and 354 represent an information portal that opens up the Internet such that any user can publish any type of information or access any type of device. The information portal can support an indefinite number of information types (e.g., web sites, file servers, databases, and image files) and any number of information sources, irrespective of whether they are structured or unstructured.

Root server 304 has multiple level one servers, including a commerce site server A 318 and commerce site server B 320.

Commerce site server A 318 represents a B2B e-commerce level one server with an e-commerce provider 322 and B2B provider 324 that are analogous to the providers described with reference to site server 16 of FIG. 3. Commerce site server A 318 has a level two commerce child site node server A1 326, which has a communication link with e-commerce provider 322 and represents an e-commerce private information network. Commerce child site node server A1 326 has an e-commerce provider 328 and information provider 330 that are analogous to the providers described with reference to child site node server 22 of FIG. 4. Commerce child site node server 326 is a private internal network in which, for example, the employees of the company owner of commerce site server A can access companywide internal proprietary documents, such as EXCEL documents. Commerce site server A 318 is shown having a communication link with an e-commerce private shopping client 332 that shops for only the products of the entity that owns commerce site server A and its child sites.

Commerce site server B 320 represents a B2B e-commerce and B2B supply side e-commerce level one server with an e-commerce provider 334 and B2B provider 336 that are analogous to the providers described with reference to site server 16 of FIG. 3. Commerce site server B 320 has two level-two child site node servers 338 and 340, both of which have communication links with B2B provider 236 and represent B2B suppliers. The two B2B supplier servers 338 and 340 can establish a B2B supply side connection by which the entity that owns commerce site server B 320 can shop for supplies. Commerce site server B 320 is shown having a communication link with a B2B private shopping client 342 that shops for only the products of the entity that owns site server B 320 and its child sites.

An e-commerce shopping client 350 and a B2B portal shopping client 352 each shop multiple markets through root server 304. E-commerce shopping client 350 enables business to consumer (B2C) retail shopping of multiple sites in multiple markets. B2B portal shopping client 352 enables B2B shopping of multiple sites in a given market and thereby creates a market making opportunity for an unlimited network merchant participants to create a live and dynamic network catalog of products.

FIG. 8 shows information public sub-root servers 312, 314, and 316 and an information private sub-root server 354 associated with what are called information application egg groups, each of which is composed of a client and a node server. An information application egg group 356 has a communication link with information public sub-root server 312; an information application egg group 358 has a communication link with information public sub-root servers 356 and 358; and an information application egg group 360 is associated with private sub-root server 354, Peer to peer (P2P) communication links 362, 364, and 366 are established, respectively, between information application egg groups 356 and 358, between information application egg groups 358 and 360, and between information application egg group 356 and information provider 330 of commerce child site server A1 326. P2P communication links are connections between stand alone computers by which a file can be downloaded from one of the computers to the other without action of a root server. Information private sub-root server 354 hosts and administers its own server and determines who gets access, rights, and privileges associated with it.

Figure 9:
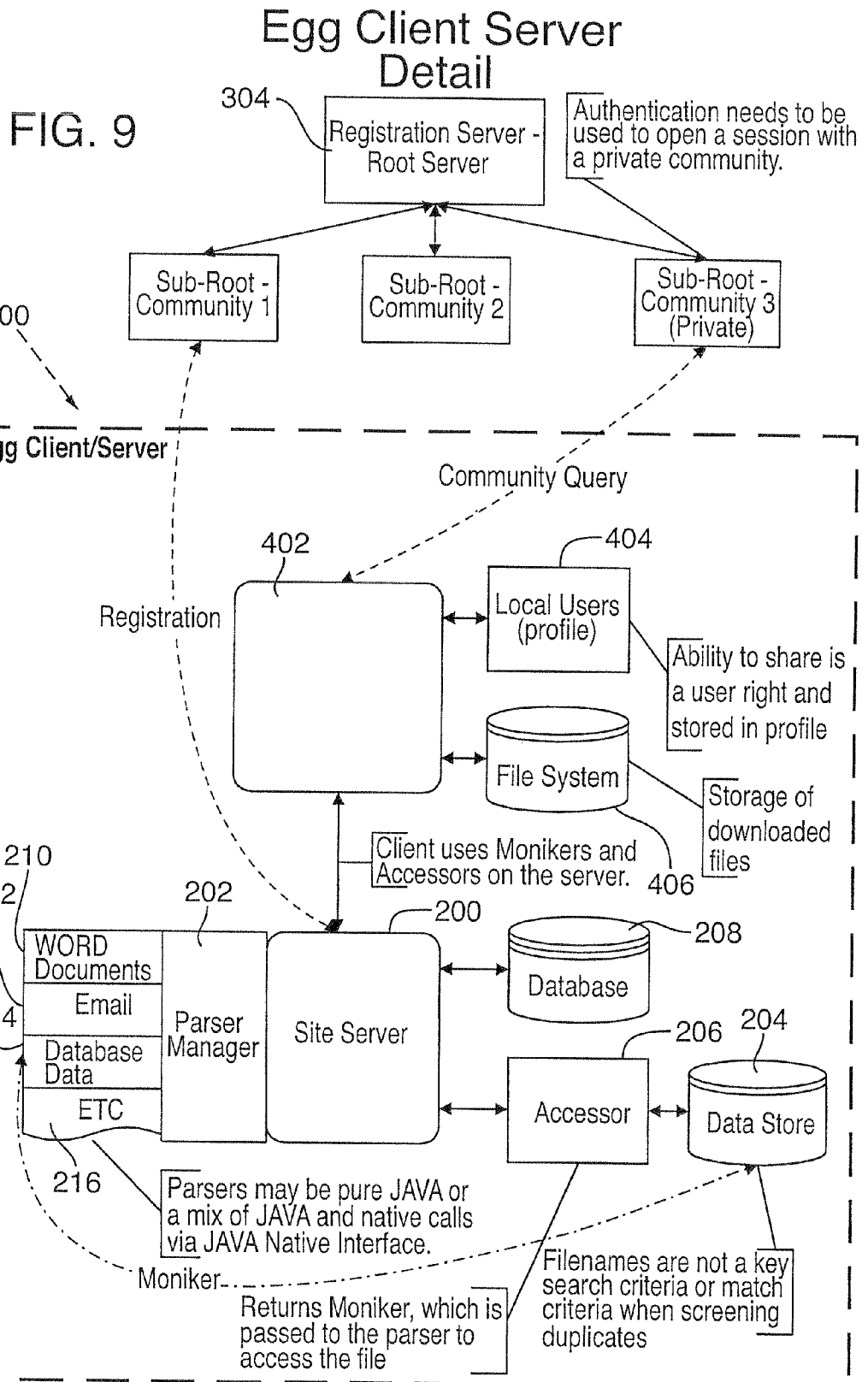
FIG. 9 is a block diagram showing in greater detail the internal structure of an information application egg group of the distributed information network of FIG. 8.

FIG. 9 is a block diagram showing in detail the components and structure of an information application egg group in operative association with root server 304 of internal network 302. With reference to FIG. 9, a registration server-root server represents the role played by root server 304; sub-root-community 1 and sub-root-community 2 represent the roles played by any two of information public sub-root servers 312, 314, and 316; and sub-root-community 3 represents the role played by information private sub-root server 354. An information application egg group is composed of two parts, which are indicated by the horizontal line dividing into two portions each of information application egg groups 356, 358, and 360 in FIG. 8. The client part of an exemplary information application egg group 400 includes as its components a client user computer 402, such as a PC and a local users profile 404 on a file system 406. The ability to share files is a user right, and profile 404 records the identifications of local users authorized by the client user. File system 406 stores files downloaded from target community servers. The server part of information application egg group 400 includes as its components site server 200; parser manager 202 and its associated parsers 210, 212, 214, and 216; data store 204 and its associated accessor 206; and database 208. This server component configuration is the same as that presented in FIG. 6; therefore, for purposes of clarity, the same reference numerals are used to indicate common components in FIGS. 6 and 9. In a preferred embodiment, the functions of the client and server parts are combined so that they reside on the same platform.

In accordance with the disclosed network, for information application egg group 400, a search by a client user causes a search query to reach community site server 200, which is included in the search process and produces a file from data store 204 for delivery to the client user.

One problematic issue arises in a P2P network, such as that established by any of P2P communication links 362, 364, and 366, stems from the fact that content can reside at any peer server on the P2P network. These servers lack specific knowledge of other peer servers on the network, other than a reference server that functions as the authoritative source of network information (i.e., a directory service). To prevent unauthorized peer clients from searching peer servers on the P2P network, the disclosed distributed information network implements a method that indicates to a peer server that a peer client requesting a search is allowed to do so.

The method is carried out by operation of registration server-root server 304 of FIG. 9, which is a central server known to all clients and used as a repository for public keys within the P2P network. When joining the P2P network for the first time, a client passes to registration server-root server 304 a public key portion of client-generated public/private key pair, together with an e-mail address and other information as required by a network administrator. The client is identified as one of the information application egg groups in FIGS. 8 and 9. The client at that time obtains the public key identifying registration server-root server 304 and stores its public key for future reference. The registration connection process is indicated by the arrow-tipped broken line between sub-root-community 1 server and site server 200 and the solid line connecting sub-root community 1 server and registration server-root server 304 in FIG. 9.

Figure 10:
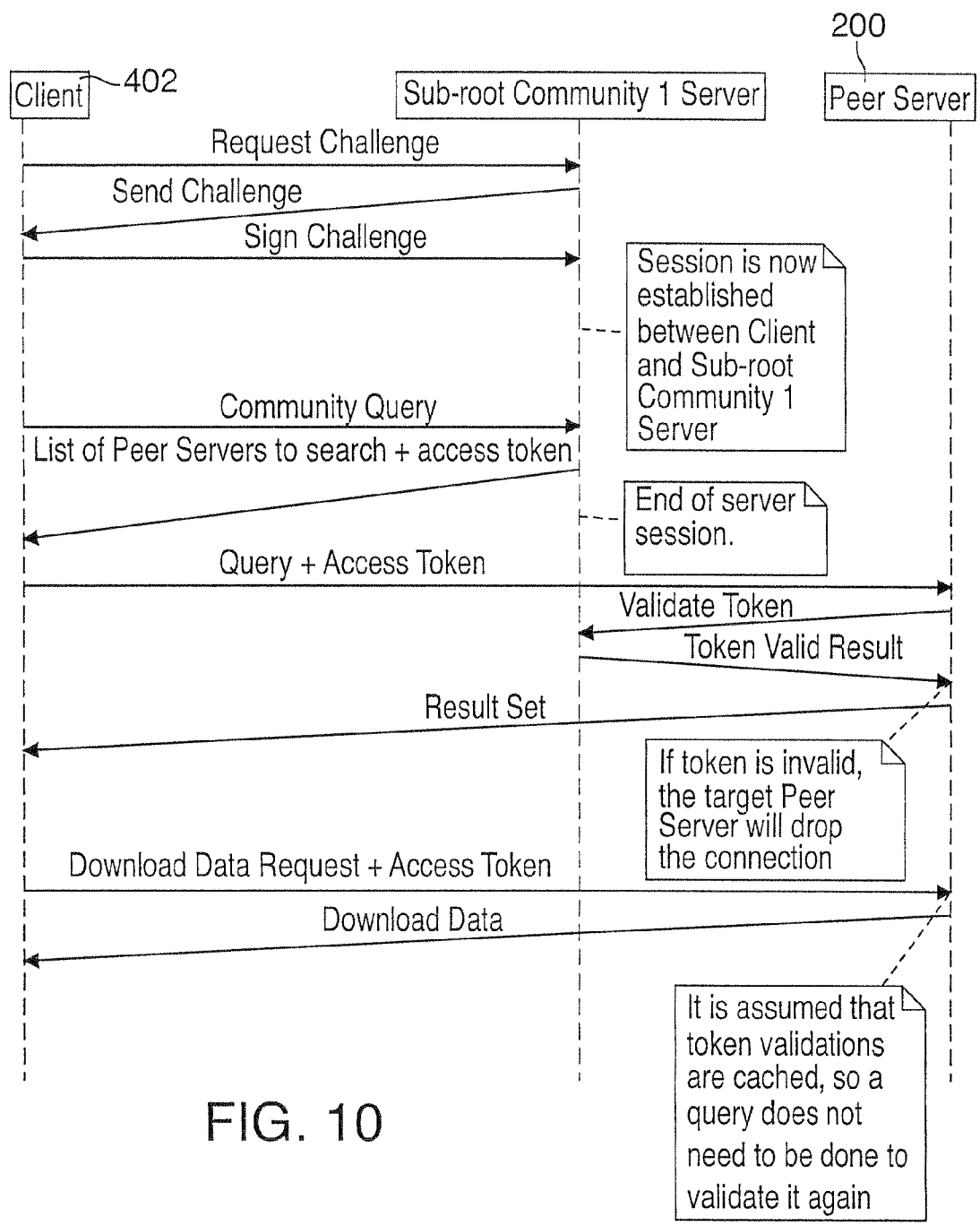
FIG. 10 is a flow diagram of a session authentication and security process for peer to peer network communications in accordance with the disclosure.

FIG. 10 is a flow diagram of the session authentication and security process carried out in a P2P network. Each of sub-root community 1-3 servers of FIG. 9 replicates the authorization functions of registration server-root server 304. Thus, these community servers store the public keys of client users of the P2P network. With reference to FIG. 10, the next time after registration, the client establishes communication with the sub-root community 1 server to request a challenge bit string. Sub-root community 1 server generates in response a random bit string and sends it to the client as a challenge bit string. The client then encrypts the challenge bit string using the client's private key and returns the encrypted challenge bit string to sub-root community 1 server. Sub-root community 1 server then decrypts the challenge bit string returned by the client using the public key sub-root community 1 server has on file for the client and compares the results of the decryption to the original challenge bit string. For successful verification, the result of decryption of the challenge bit string with the public key matches the original challenge bit string thereby, providing the identity of the client.

Once the client's identity has been established, sub-root community 1 server returns to the client an access token that allows the client to query other peer servers in the P2P network. This access token includes, for example, the IP address reported by the client during the challenge/response and a time stamp from sub-root community 1 server. The access token is then signed using the private key of sub-root community 1 server.

When it wishes to search a target peer server for information, the client passes the access token along with the query request packet. The target peer server 200 that receives the request then validates the access token. The validation process can take one of two forms. Since it knows the public key of the sub-root community 1 server, target peer server 200 can itself validate the access token. Alternatively, the access token can be passed to the sub-root community 1 server and validated there. If the time stamp is used to create an access token with a limited lifetime, checking back with sub-root community 1 server would eliminate any problems with time zones. A determination of a valid access token results in delivery of a download data request accompanied by the access token to target peer server 200, which in response downloads data to client 402.

Proof of client identity is undertaken at the start of any session with a remote system, so that if a search is performed during a session that is different from a file transfer session, the access token would be resent and reverified when the file transfer session is started.

To demonstrate additional capability of distributed information network 300, FIG. 9 shows with an arrow-tipped broken line a community query connection between client 402 and private sub-root community 3 server to illustrate the ability of client 402 to search a private community server. An authentication process is undertaken to open a session with a private community server.

Another problematic issue arises in connection with a distributed environment in which files or other information is shared. Because the share permissions preferably reside at the data source, security risks stem from a potential attacker wishing to share unapproved content and having physical access to the computer containing the data and share information. This situation allows for two classes of attack. The first class is the replacement of the data source itself. This is most easily accomplished by overwriting a shared file with an unapproved file. The second class of attack is modification of the share information, which typically will reside in a database. Altering these data can allow the data to point to an unapproved file rather than to the approved content.

Figure 11:
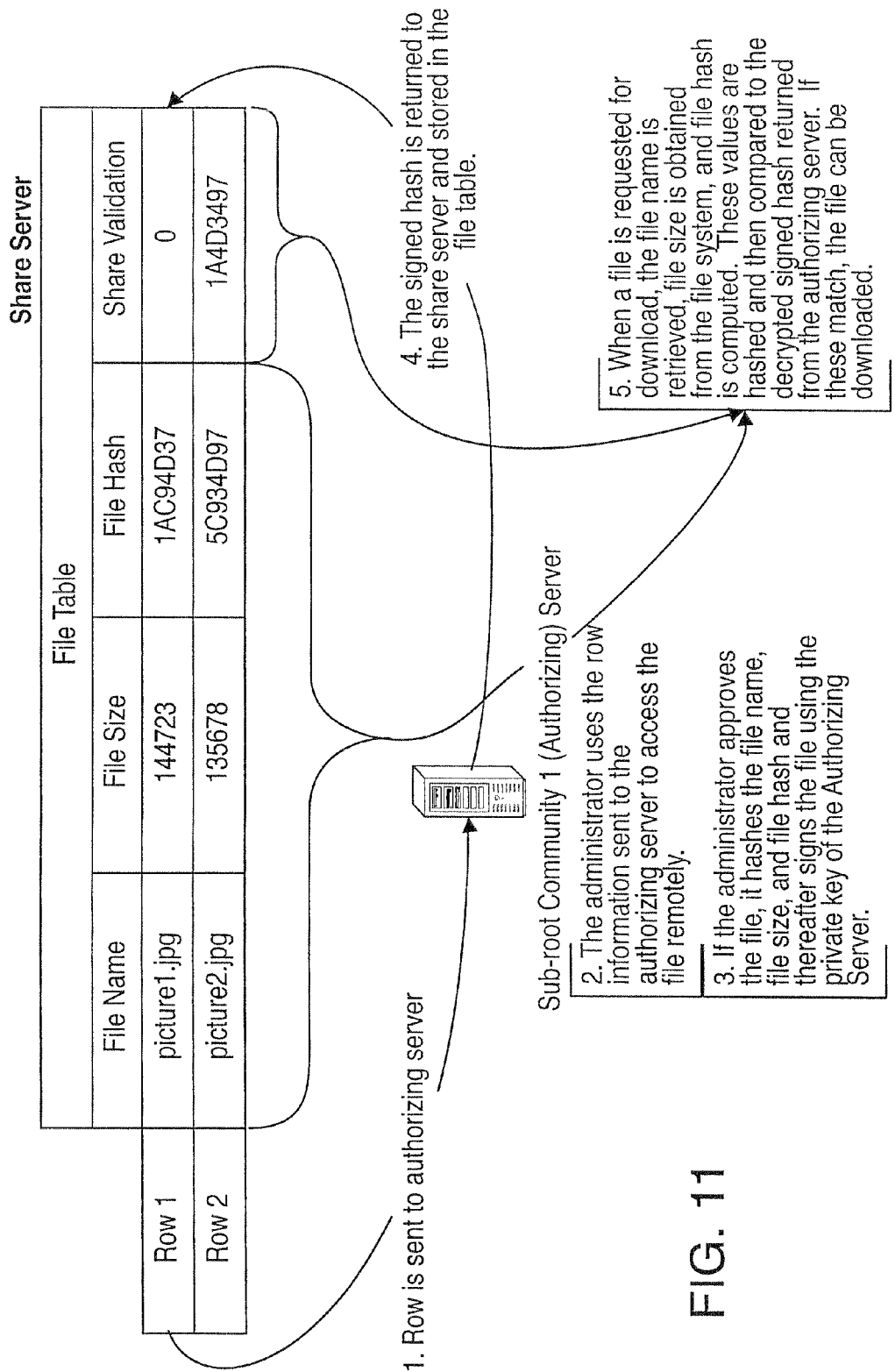
FIG. 11 is a flow diagram outlining the steps of a process for providing file sharing security in a distributed environment.

FIG. 11 is a flow diagram outlining the five steps of a process for providing file sharing security in a P2P network. With reference to FIG. 11, sub-root community 1 server functioning as an administrator has, as described with reference to FIG. 10, approval authority for content and is identified by a public/private key pair. The public key portion of this key pair is distributed to all peer node servers on the P2P network.

An event when a user wishes to share content represents step 1 of the process. Information about such content (shown as row 1 information of the share server file table) including the name of the file, the size of the file, and the hash of the file is sent to the sub-root community 1 (authorizing) server. (A "hash" is formed by a cryptographic algorithm, is a condensed representation of the contents of a file.) The sub-root community 1 server examines the file to ensure the content is appropriate.

Step 2 entails use by sub-root community 1 server of the row 1 information to access the file remotely. Step 3 entails approval of the file by sub-root community 1 server, which hashes the file name, file size, and file hash. When it approves the file for sharing, the sub-root community 1 server, using its private key, signs the information that was sent to it. Step 4 represents that the signature, together with the shared content, is stored in the file table on the share server.

Step 5 represents when a share server receives a request for download of a file of shared information to a peer server. The share server in response retrieves the file name, obtains the file size from the file system, and computes the file hash. These three values are then hashed and compared against the decrypted signed hash returned from sub-root community 1 server. If any of these values do not match, the file is not made available to the peer server requesting the download. Otherwise, the file is made available to the peer server.

Although it is described with reference to a P2P network, the file sharing security process can be implemented in any network in which a server can achieve controlled access to a file residing on a remotely located server.

The descriptions presented above relate to systems and techniques for gathering and searching for information available at sites of globally accessible information network 10. In a global community, there will exist sites that are not universally accessible in network 10 because of a variety of access barriers including, but not limited to, routing translations, physical paths, private internal networks, and security mechanisms that restrict communication. The following implementation described below by way of illustration with reference to Site C server 20, Site C child server 26, and Site C2 node server 30 allows the global network of servers to provide paths for the routing or flow of information as necessary, while maintaining universal accessibility.

With reference to network 10 in FIG. 1, when Site C server 20, Site C child server 26, and Site C2 node server 30 are directly connected as indicated in FIG. 1 with no firewalls or other security restrictions, client applet 12 can query Site C server 20 and wilt receive a response that contains zero or more direct responses from Site C server 20 and will receive zero or more additional sites that may contain relevant data to search. The additional sites to search are returned from Site C server 20, based on profile data that child sites 26 and 30 of Site C server 20 have rolled up to it. These profile data are placed in child site profile database 90 (FIG. 3) of Site C server 20, and the sites represented by these profile data are searched as part of all incoming queries. For example, if Site C child server 26 is returned by Site C server 20 as an additional site to search, client applet 12 would then initiate a search of Site C child server 26, which would return zero or more direct responses from Site C child server 26 and would receive zero or more additional sites to search that may contain relevant data.

Figure 12:
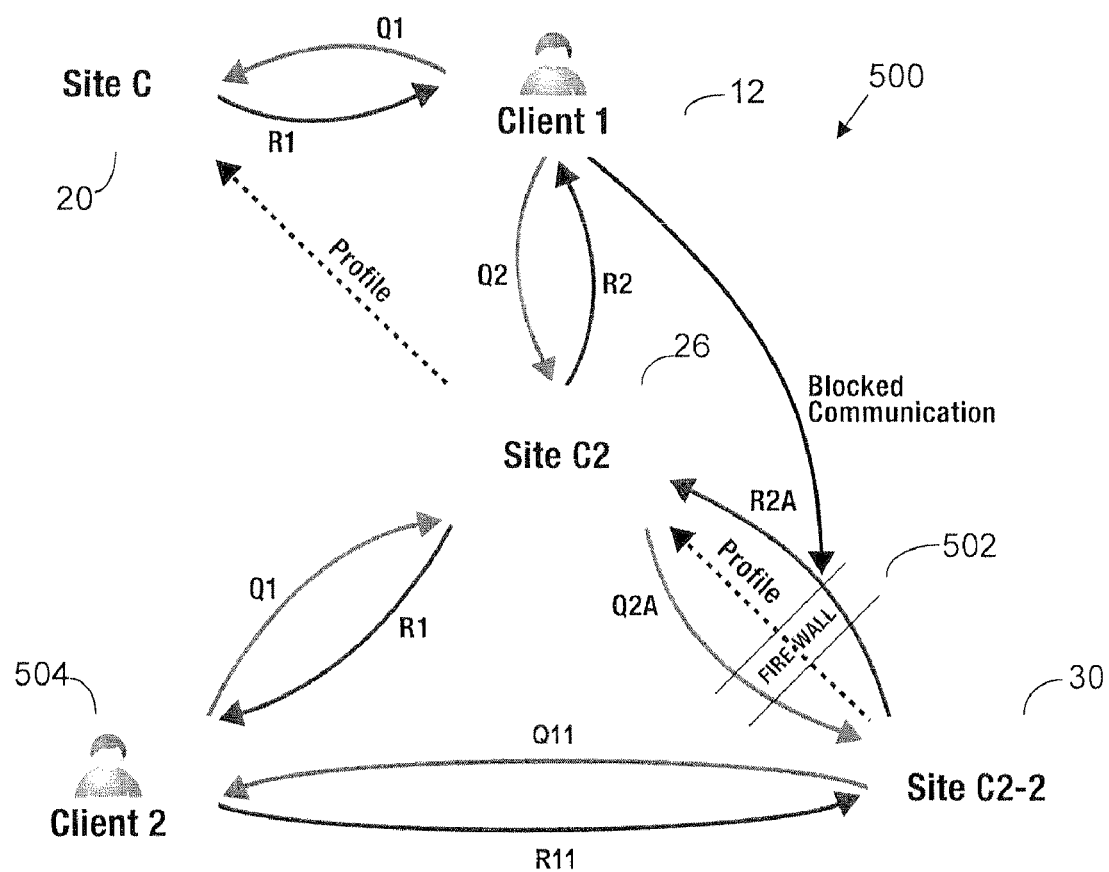
FIG. 12 is a block diagram of a distributed application network that is similar to the network of FIG. 1 except that a firewall is in place between different level child servers of a site.

It is not always possible, however, for client applet 12 to directly search a node in network 10 because of security measures in place on network 10. FIG. 12 is a block diagram of a distributed application network 500 that is similar to network 10 but has a firewall 502 in place between Site C child server 26 and Site C2 node server 30. With reference to FIG. 12, client applet 12 (Client 1) is located outside of firewall 502 and does not have permission to access Site C2 node server 30. Site C child server 26, which is the parent of Site C2 node server 30, stores in the site profile of Site C child server 26 information that a firewall is present between it and Site C2 node server 30 and that addresses like the address of client applet 12 and the address of Site C server 20 cannot directly access Site C2 node server 30. However, addresses of clients such as a client applet 504 (Client 2) can directly access Site C2 node server 30.

In network 500, client applet 12 contacts (Q1) Site C server 20 as before and receives a response (R1) that includes Site C child server 26. Client applet 12 then queries (Q2) Site C child server 26, which prepares to return any local data results it has, and then checks child site profile database 90 to determine whether there are any child sites that contain relevant data. Site C child server 26 determines that Site C2 node server 30 does contain relevant data, but notes that client applet 12 is not allowed direct contact with Site C2 node server 30. Communication pathway Q1, R1 and communication pathway Q2, R2 in combination represent from Site C server 20 and Site C child server 26 a communication pathway link that is blocked by firewall 502, and communication pathway Q2, R2 represents from client applet 12 and Site C child server 26 a communication pathway link that is blocked by firewall 502. Site C child server 26 sends, therefore, the query (Q2A) to Site C2 node server 30 and receives from it any results (R2A) and includes these results, together with the local results (R2) of Site C child server 26 that it sends back to client applet 12. Communication pathway Q2A, R2A represents from Site C child server 26 and Site C2 node server 30 a communication pathway link that functions as a bypass of firewall 502 for delivery of any information content from Site C2 node server 30 to the communication pathway link of, in this illustration, client applet 12.

In network 500, client applet 504 is allowed to directly contact Site C2 node server 30. Client applet 504 queries (Q11) Site C child server 26, which notes that Site C2 node server 30 has relevant information and that client applet 504 can contact Site C2 node server 30. Site C child server 26 returns, therefore, local results (R11) and Site C2 node server 30 to client applet 504. Client applet 504 then directly queries (Q2) Site C2 node server 30 and receives results (R2).

It will be obvious to those having skill in the art that many changes may be made to the details of the above-described embodiments without departing from the underlying principles thereof. As a first example, the functions of a client (e.g., client applet) and a root server can be combined so that they reside on the same platform. As a second example, an applet, an application, a network browser, or other type of operating system client can be used to initiate a topic query or search. The scope of the invention should, therefore, be determined only by the following claims.

The invention claimed is:

1. A distributed information network constructed for gathering information from sites distributed across a globally accessible computer network, comprising:
   a root server that stores a list of multiple distributed sites each of which represented by metadata corresponding to directly or indirectly available information content;
   multiple distributed sites each of which implemented with an information provider that is remotely located from the root server, the information provider of each of the distributed sites storing metadata corresponding to information content that is retrievable from the site of or a site associated with the information provider, the information content being retrievable in response to a profiled information search request for search results derivable from the information content to which the metadata correspond by a search performed on information content available at the site or sites associated with the information provider; and
   a profiled information communication link between the root server and each of the multiple distributed sites, the profiled information communication link enabling formation of a path for delivery of the search results of directly or indirectly available information content to which the metadata correspond to a destination site from a site or sites represented by the metadata of the profiled information search request, the search results of directly or indirectly available information content organized for content-specific presentation.

2. The distributed information network of claim 1, in which the multiple distributed sites are configured to host and maintain their own information content while they are available for access by information search requests originating from remotely located globally accessible computer network sources.

3. The distributed information network of claim 1, further comprising an operating system client that delivers to the root server an information search request by a user and receives without passing through the profiled information communication link the search results retrieved from the site or sites in response to the profiled information search request.

4. The distributed information network of claim 3, in which the operating system client comprises one of a network browser, an applet, or an application.

5. The distributed information network of claim 1, in which at least one of the multiple distributed sites implements a local information network and further comprises:
   a local root server that stores a list of multiple distributed local sites each of which represented by local metadata corresponding to directly or indirectly available information content; and
   multiple distributed local sites each of which implemented with an information provider in which are stored local metadata corresponding to information content that is retrievable in response to a local profiled information search request for search results derivable from the information content to which the local metadata correspond by a search performed on information content available at the local site or sites associated with the information provider.

6. The distributed information network of claim 1, in which one site of the multiple distributed sites includes multiple levels of servers searched in response to the profiled information search request.

7. The distributed information network of claim 6, in which the multiple levels of servers of the one site include a first level server and the information content retrieved in response to the profiled information search request includes data from the first level server and a list of one or more servers that are included in the multiple levels of servers searched and that contain data relevant to the profiled information search request.

8. The distributed information network of claim 7, in which the multiple levels of servers searched further include second and third level servers, and further comprising:
   an access barrier of the profiled information search request to the information communication link between the first level server or an applet associated with the one site and the third level server but not between the second level server and the third level server; and
   first and second communication pathway links of the profiled information communication link, the first communication pathway link connecting the first level server or the applet associated with the one site and the second level server to deliver the profiled information search request to the second level server, and the second communication pathway link connecting the second level server and the third level server to deliver the profiled information search request to the third level server, and thereby providing through the second level server a bypass of the access barrier for delivery, in response to the profiled information search request, of information content from the third level server to the first communication pathway link.

9. The distributed information network of claim 1, in which the multiple distributed sites include site servers for at least one of an e-commerce network, a business to business network, a business to business supply site network, a peer to peer network, or a community information network.

10. The distributed information network of claim 1, in which the root server includes a query parser interface having a site provider and a core provider, the site provider identifying a certain one or certain ones of the multiple distributed sites corresponding to the metadata representing topic profiles indicative of the information content and the core provider identifying properties of topics represented by the topic profiles.

11. The distributed information network of claim 10, in which the site and core providers are operatively associated with respective site profile and topic databases and in which the query parser interface accesses and retrieves information content from the site profile and topic databases to assemble a packet of information including a list identifying a site server or site servers qualified to be searched for information content.

12. The distributed information network of claim 1, in which at least one of the multiple distributed sites implements a peer to peer local information network and further comprises:

multiple distributed peer local sites each of which implemented with an information provider in which peer local metadata are stored and retrievable in response to a peer local profiled information search request for search results derivable from the information content to which the peer local metadata correspond; and a peer local root server that stores a list of the multiple distributed peer local sites, each of which represented by metadata corresponding to directly or indirectly available information content, and issues an access token in response to receipt of a search request by a qualified one of the multiple distributed local sites to provide an approved path for delivery of peer local search results that are responsive to the search request.

13. The distributed information network of claim 12, in which the access token is issued in accordance with a process of encryption and decryption with a public/private key pair.

14. The distributed information network of claim 1, in which at least one of the multiple distributed sites implements a local information network and further comprises:

a local root server that is identified by a root server public/private key pair having a public key portion and that stores a list of multiple distributed local sites each of which represented by local metadata corresponding to directly or indirectly available information content and public key portions of site public/private key pairs generated by the multiple distributed local sites; and multiple distributed local sites each of which implemented with an information provider in which are stored local metadata corresponding to information content that is retrievable in response to a local profiled information search request for search results derivable from the information content to which the local metadata correspond, and the multiple distributed local sites storing the root server public key portion for use in carrying out a cryptographic algorithm to prevent unauthorized changes to information content represented by the stored local metadata.

15. The distributed information network of claim 14, in which the multiple distributed local sites form part of a peer to peer network.

16. The distributed information network of claim 1, in which each of the multiple distributed sites includes a local administration interface and an associated local metadatabase, the local administration interface updating its associated local metadatabase to provide a current record of content locally available at the server.

17. The distributed information network of claim 16, in which at least one of the multiple distributed sites includes multiple levels of servers and the local metadatabase provides a current record including content available from at least one server level of the multiple levels of servers.

18. A method of gathering information from multiple sites distributed across a globally accessible computer network, comprising:

implementing with each of the multiple distributed sites an information provider storing metadata corresponding to information content that is retrievable from the site of or a site associated with the information provider, the information content being retrievable in response to a profiled information search request for search results derivable from the information content to which the metadata correspond;

establishing a profiled information communication link between a root server that stores a list of multiple distributed sites each of which represented by metadata corresponding to directly or indirectly available information content and each of the multiple distributed sites storing metadata corresponding to information content that is retrievable in response to a profiled information search request;

transmitting from an operating system client to the root server a profiled information search request for search results derivable from the information content to which the metadata correspond by a search performed on information content available at the site or sites associated with the information provider;

forming a communication path for delivery of the search results of directly or indirectly available information content to which the metadata correspond to a destination site from a site or sites represented by the metadata of the profiled information search request; and delivering to the destination site the search results of directly or indirectly available information content organized for content-specific presentation.

19. The method of claim 18, further comprising providing a communication link to the operating system client to deliver to it the search results retrieved from the destination site or sites in response to the profiled information search request.

20. The method of claim 18, in which each of the multiple distributed sites includes a local administration interface and an associated local metadatabase, the local administration interface updating its associated local metadatabase to provide a current record of content locally available at the server.

21. The method of claim 20, in which at least one of the multiple distributed sites includes multiple levels of servers and the local metadatabase provides a current record including content available from at least one server level of the multiple levels of servers.

* * * * *